United States Patent
Nojima

(10) Patent No.: US 10,635,647 B2
(45) Date of Patent: Apr. 28, 2020

(54) NON-TRANSITORY RECORDING MEDIUM STORING INFORMATION PROCESSING PROGRAM AND INFORMATION PROCESSING METHOD

(71) Applicant: Konica Minolta, Inc., Tokyo (JP)

(72) Inventor: Nobuhiro Nojima, Tachikawa (JP)

(73) Assignee: Konica Minolta, Inc., Tokyo (JP)

( * ) Notice: Subject to any disclaimer, the term of this patent is extended or adjusted under 35 U.S.C. 154(b) by 270 days.

(21) Appl. No.: 15/894,986

(22) Filed: Feb. 13, 2018

(65) Prior Publication Data

US 2018/0232408 A1    Aug. 16, 2018

(30) Foreign Application Priority Data

Feb. 15, 2017 (JP) ................. 2017-025701

(51) Int. Cl.
*G06F 16/22* (2019.01)
*H04L 29/08* (2006.01)
*G06F 16/26* (2019.01)
*G06Q 10/10* (2012.01)
*G06Q 10/06* (2012.01)

(52) U.S. Cl.
CPC .............. *G06F 16/22* (2019.01); *G06F 16/26* (2019.01); *G06Q 10/063112* (2013.01); *G06Q 10/10* (2013.01); *H04L 67/22* (2013.01); *H04L 67/306* (2013.01)

(58) Field of Classification Search
None
See application file for complete search history.

(56) References Cited

U.S. PATENT DOCUMENTS

| 2014/0019542 | A1* | 1/2014 | Rao ....................... H04L 67/306 709/204 |
| 2014/0101169 | A1* | 4/2014 | Kurata ................... G06Q 10/06 707/748 |
| 2017/0093991 | A1* | 3/2017 | Douglas ................ H04L 67/141 |
| 2018/0032997 | A1* | 2/2018 | Gordon .............. G06Q 20/3224 |

FOREIGN PATENT DOCUMENTS

JP    2006-155421 A    6/2006

\* cited by examiner

*Primary Examiner* — Wilson Lee
(74) *Attorney, Agent, or Firm* — Osha Liang LLP

(57) ABSTRACT

A method of information processing includes: obtaining either or both a plurality of behavior logs that include a plurality of behavior history records and a plurality of communication information that indicate plural aspects of communication behavior given by processing the plurality of behavior logs for an individual; determining a behavioral characteristic that indicates how the individual is likely to behave by weighting either or both of the plurality of behavior logs and the plurality of communication information using predetermined weightings and combining the plurality of behavior logs and the plurality of communication information that have been weighted; and recording the behavioral characteristic into a database in the storage device.

15 Claims, 13 Drawing Sheets

FIG. 5

| PERSON | FREQUENCY OF EMAIL COMMUNICATIONS (PER DAY) | FREQUENCY OF PHONE CALLS (PER DAY) | FREQUENCY OF SPEAKING (PER MEETING) |
|---|---|---|---|
| A | 10 | 2 | 2 |
| B | 5 | 10 | 8 |
| C | 1 | 4 | 5 |

FIG. 6

| BEHAVIOR LOG | | EMAIL HISTORY | PHONE CALL HISTORY | MEETING MINUTES |
|---|---|---|---|---|
| | COMMUNICATION INFORMATION | FREQUENCY | FREQUENCY | FREQUENCY OF SPEAKING |
| BEHAVIORAL CHARACTERISTICS | EASY TO CONTACT | 4 | 4 | 2 |
| | EXPECTED TO BE IMPORTANT | 2 | 1 | 7 |

FIG. 7

| PERSON | EASY TO CONTACT |
|---|---|
| A | 52 |
| B | 76 |
| C | 30 |

FIG. 8

| PERSON | EASY TO CONTACT | EXPECTED TO BE IMPORTANT | IMPORTANT & EASY TO CONTACT |
|---|---|---|---|
| A | 52 | 36 | 88 |
| B | 76 | 76 | 152 |
| C | 30 | 41 | 71 |

FIG. 9

| | EASY TO CONTACT | EXPECTED TO BE IMPORTANT |
|---|---|---|
| IMPORTANT & EASY TO CONTACT | 4 | 6 |

FIG. 10

| PERSON | EASY TO CONTACT | EXPECTED TO BE IMPORTANT | IMPORTANT & EASY TO CONTACT |
|---|---|---|---|
| A | 52 | 36 | 424 |
| B | 76 | 76 | 760 |
| C | 30 | 41 | 366 |

FIG. 13

| No. | OBTAINED DATE | ADDRESS | KIND OF BEHAVIOR LOG |
|---|---|---|---|
| 1 | 2016/4/2 10:00 | 192.168.1.11 | EMAIL HISTORY |
| 2 | 2016/4/2 11:00 | 192.168.1.12 | MEETING MINUTES |
| 3 | 2016/4/3 9:10 | 192.168.1.13 | PHONE CALL HISTORY |
| 4 | 2016/4/3 13:00 | 192.168.1.14 | RECORD OF BUSINESS-CARD EXCHANGE |
| 5 | 2016/4/3 17:00 | 192.168.1.15 | GPS LOG |

FIG. 14

| No. | DATE | ID | KIND OF COMMUNICATION | PARTICIPANT 1 | PARTICIPANT 2 | PARTICIPANT n | REMARKS |
|---|---|---|---|---|---|---|---|
| 1 | 2016/5/2 10:00 | 100 | EMAIL | a | b | ... | |
| 2 | 2016/5/2 11:00 | 101 | MEETING MINUTES | a | b | ... | |
| 3 | 2016/5/3 9:10 | 101 | MEETING MINUTES | a | c | ... | VERY CLOSE |
| 4 | 2016/5/3 13:00 | 102 | BUSINESS-CARD EXCHANGE | a | d | ... | |
| 5 | 2016/5/3 17:00 | 103 | EMAIL | b | a | ... | REPLY TO #101 |

FIG. 16

| No. | BEHAVIORAL CHARACTERISTICS | COMMUNICATION INFORMATION |
|---|---|---|
| 1 | COMMUNICATION ABILITY | EMAIL FREQUENCY, PHONE CALL FREQUENCY, FREQUENCY OF SPEAKING AT MEETING |
| 2 | FREQUENTLY USED WAY TO RESPOND | EMAIL FREQUENCY, PHONE CALL FREQUENCY |
| 3 | EXPECTED RESPONCE TIME | EMAIL RESPONSE TIME, PHONE CALL RESPONSE TIME |
| 4 | DEGREE OF POLITENESS | EMAIL CONTENTS, PHONE CALL CONTENTS, CONTENTS OF SPEAKING AT MEETINGS |
| 5 | DEGREE OF CLOSENESS | EMAIL FREQUENCY, PHONE CALL FREQUENCY, FREQUENCY OF MEETING ATTENDANCE |
| 6 | DEGREE OF GENTLENESS | EMAIL CONTENTS, PHONE CALL CONTENTS, CONTENTS OF SPEAKING AT MEETINGS |

FIG. 17

| No. | BEHAVIORAL CHARACTERISTICS | EMAIL | PHONE CALL | MEETING |
|---|---|---|---|---|
| 1 | LEVEL OF COMMUNICATION SKILLS | 5 | 0 | 5 |
| 2 | FREQUENTLY USED WAY TO RESPOND | 5 | 5 | 0 |
| 3 | EXPECTED RESPONCE TIME | 9 | 1 | 0 |
| 4 | DEGREE OF POLITENESS | 3 | 7 | 0 |
| 5 | DEGREE OF CLOSENESS | 1 | 9 | 0 |
| 6 | DEGREE OF GENTLENESS | 2 | 6 | 2 |

FIG. 18
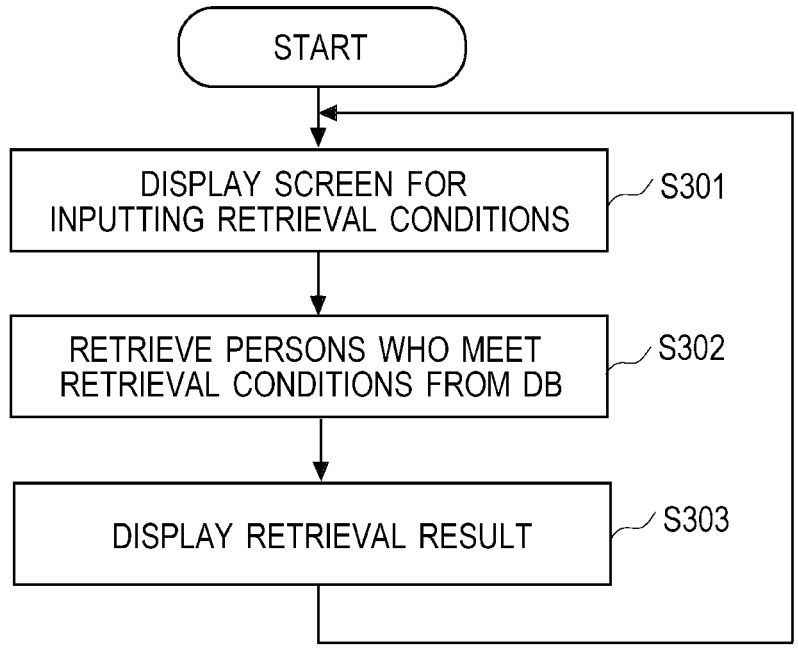
FIG. 19
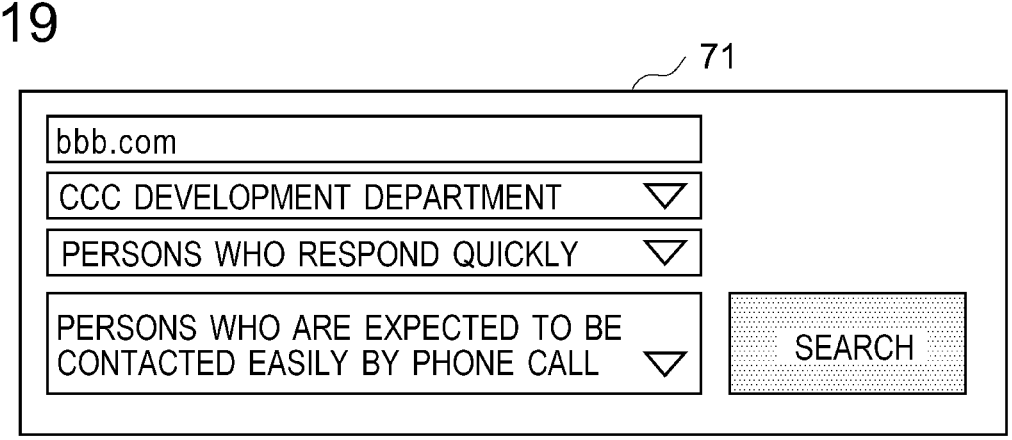
FIG. 20

FIG. 21
RELATED ART

|  | EMAIL | |
|---|---|---|
|  | FREQUENCY | NUMBER OF RECIPIENTS |
| EASY TO CONTACT | 10 | 0 |
| EXPECTED TO BE IMPORTANT | 0 | 10 |

FIG. 22

|  | EMAIL | | PHONE CALL | MEETING |
|---|---|---|---|---|
|  | FREQUENCY | NUMBER OF RECIPIENTS | FREQUENCY | FREQUENCY OF SPEAKING |
| EASY TO CONTACT | 4 | 0 | 4 | 2 |
| EXPECTED TO BE IMPORTANT | 0 | 5 | 0 | 5 |

NON-TRANSITORY RECORDING MEDIUM STORING INFORMATION PROCESSING PROGRAM AND INFORMATION PROCESSING METHOD

CROSS-REFERENCE TO RELATED APPLICATIONS

Japanese Patent Application No. 2017-025701 filed on Feb. 15, 2017, including description, claims, drawings, and abstract, the entire disclosure of which is incorporated herein by reference in its entirety.

BACKGROUND

Technical Field

The present invention is directed to non-transitory recording media each storing an information processing program and information processing methods. In particular, the present invention is directed to non-transitory recording media each storing an information processing program and information processing methods, which allow the retrieval of a person of interest on the basis of versatile characteristics of human behavior.

Description of the Related Art

Human behavior varies depending on one's personality and environment. Information that indicates how one is likely to behave is defined as behavioral characteristics. As one example of the behavioral characteristics, one's communication ability (like influence of one's communication behavior on the whole organization) can be determined from one's relations with other persons in email communications; and as another example of the behavioral characteristics, expected response time (how quick one is likely to give a response) can be determined from the frequency of one's telephone calls. These behavioral characteristics can be used for finding a person of interest from a database. One who just needs a current status of certain business but does not need a formal business meeting, should preferably get in touch with a person who is usually ready and willing to be consulted or a person who is easy to talk to, rather than a higher ranking executive. Therefore, a use of information of the communication ability and the expected response time for person retrieval, allows one who needs such information to find out a person of interest.

As one example of techniques relating to the behavioral characteristics, Japanese Unexamined Patent Publication (JP-A) No. 2006-155421 discloses the following communication-role analyzer for determining a role of each of group members in group communications. The communication-role analyzer is configured to refer to records of incoming and outgoing emails stored in a mail server and find an email sent by one of recipients of a certain email from among emails within predetermined limits, to determine the email as an email that inherits a subject of the message of the certain email. The communication-role analyzer is further configured to obtain, for each group member, the number of emails that inherit subjects of messages of other emails from among emails of the each group member. The communication-role analyzer is further configured to calculate the influence of each group member on inheritance of subjects of messages, from the number of emails determined to inherit subjects of messages of other emails, on the basis of the records excluding incoming and outgoing emails of the group member, and the number of emails determined to inherit subjects of messages of other emails, on the basis of the records including incoming and outgoing emails of the group member. The communication-role analyzer is further configured to determine the communication role of each group member by using the number of incoming emails received by the group member in a predetermined period, the number of outgoing emails sent by the group member in a predetermined period, the ratio of emails determined to inherit subjects of messages of other emails, among incoming and outgoing emails of the group member, and the influence of the group member.

As a method for determining behavioral characteristics to be used for retrieving a person of interest, there can be considered a method of determining behavioral characteristics of a target person from records of incoming and outgoing emails, as disclosed by JP-A No. 2006-155421. However, this method allows the retrieval of only a person who can be found out from records of incoming and outgoing emails. In other words, this method allows one to search for a person just in view of email communications, even if the one hopes to find an easy person to contact with, by email, telephone call, face-to-face meeting or any other way, and the one can fail to find out a person of interest.

SUMMARY

One or more embodiments of the present invention are directed to non-transitory recording media each storing an information processing program and information processing methods, which allow retrieval of a desired person on the basis of versatile characteristics of human behavior.

A non-transitory recording medium according to one or more embodiments of the present invention stores a computer-readable program for information processing to be executed in a computing device connected to a storage device. The program comprises instructions which, when executed by a hardware processor of the computing device, cause the computing device to perform the following operations. The operations comprise obtaining, from the storage device, either or both of plural kinds of behavior log and plural kinds of communication information for each person, where the plural kinds of behavior log are plural kinds of behavior history record of each person, and the plural kinds of communication information indicate plural aspects of communication behavior of each person, given by processing the plural kinds of behavior log. The operations further comprise determining at least one kind of behavioral characteristic of each person, which indicates how the each person is likely to behave, by weighting the either or both of the plural kinds of behavior log of the each person and the plural kinds of communication information of the each person by using predetermined weightings and combining the either or both of the plural kinds of behavior log of the each person and the plural kinds of communication information of the each person which were weighted. The operations further comprise recording the at least one kind of behavioral characteristic of each person into a database in the storage device in a form suitable for person retrieval.

An information processing method according to one or more embodiments of the present invention is a method for use in an information processing system including a collection server, a storage device and an analysis server, where the collection server and the analysis server are each connected to the storage device. The method comprises first obtaining, by the collection server, plural kinds of behavior log of each person which are plural kinds of behavior history record of each person. The method further comprises first determining, by the collection server, plural kinds of communication information of each person, which indicate plural aspects of communication behavior of each person, by processing the plural kinds of behavior log, and first recording, by the collection server, either or both of the plural kinds of behavior log of each person and the plural kinds of communication information of each person, into the storage device. The method further comprises second obtaining, from the storage device by the analysis server, the either or both of the plural kinds of behavior log and the plural kinds of communication information for each person. The method further comprises second determining, by the analysis server, at least one kind of behavioral characteristic of each person, which indicates how the each person is likely to behave, by weighting the either or both of the plural kinds of behavior log of the each person and the plural kinds of communication information of the each person by using predetermined weightings and combining the either or both of the plural kinds of behavior log of the each person and the plural kinds of communication information of the each person which were weighted. The method further comprises second recording, by the analysis server, the at least one kind of behavioral characteristic of each person into a database in the storage device in a form suitable for person retrieval.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 5 illustrates an example of multiple kinds of communication information determined by the correction server according to one or more embodiments of the present invention;

FIG. 6 illustrates an example of a table for determining behavioral characteristics (table of weightings for multiple kinds of communication information) to be used by the analysis server according to one or more embodiments of the present invention;

FIG. 7 illustrates an example of a determination result of behavioral characteristics given by the analysis server according to one or more embodiments of the present invention;

FIG. 8 illustrates another example of a determination result of behavioral characteristics given by the analysis server according to one or more embodiments of the present invention;

FIG. 9 illustrates an example of a table for determining behavioral characteristics (table of weightings for multiple kinds of behavioral characteristics) to be used by the analysis server according to one or more embodiments of the present invention;

FIG. 10 illustrates another example of a determination result of behavioral characteristics given by the analysis server according to one or more embodiments of the present invention;

FIG. 13 illustrates an example of a list of behavior-log management servers to be used by the collection server according to one or more embodiments of the present invention;

FIG. 14 illustrates an example of a way to process behavior logs by the collection server, according to one or more embodiments of the present invention;

FIG. 16 illustrates an example of a table for determining behavioral characteristics (table which associates behavioral characteristic with communication information) to be used by the analysis server according to one or more embodiments of the present invention;

FIG. 17 illustrates an example of a table for determining behavioral characteristics (table of weightings for multiple kinds of communication information) to be used by the analysis server according to one or more embodiments of the present invention;

FIG. 18 is a flowchart illustrating an example of operations of the application server according to one or more embodiments of the present invention;

FIG. 19 is a diagram illustrating an example of a screen for inputting retrieval conditions to be displayed on the application server according to one or more embodiments of the present invention;

FIG. 20 is a diagram illustrating an example of a retrieval result screen to be displayed on the application server according to one or more embodiments of the present invention;

FIG. 21 illustrates an example of weightings to be used in conventional determination of behavioral characteristics according to one or more embodiments of the present invention; and FIG. 22 illustrates an example of weightings to be used in determination of behavioral characteristics, according to one or more embodiments of the present invention.

DETAILED DESCRIPTION OF EMBODIMENTS

Figure 1:
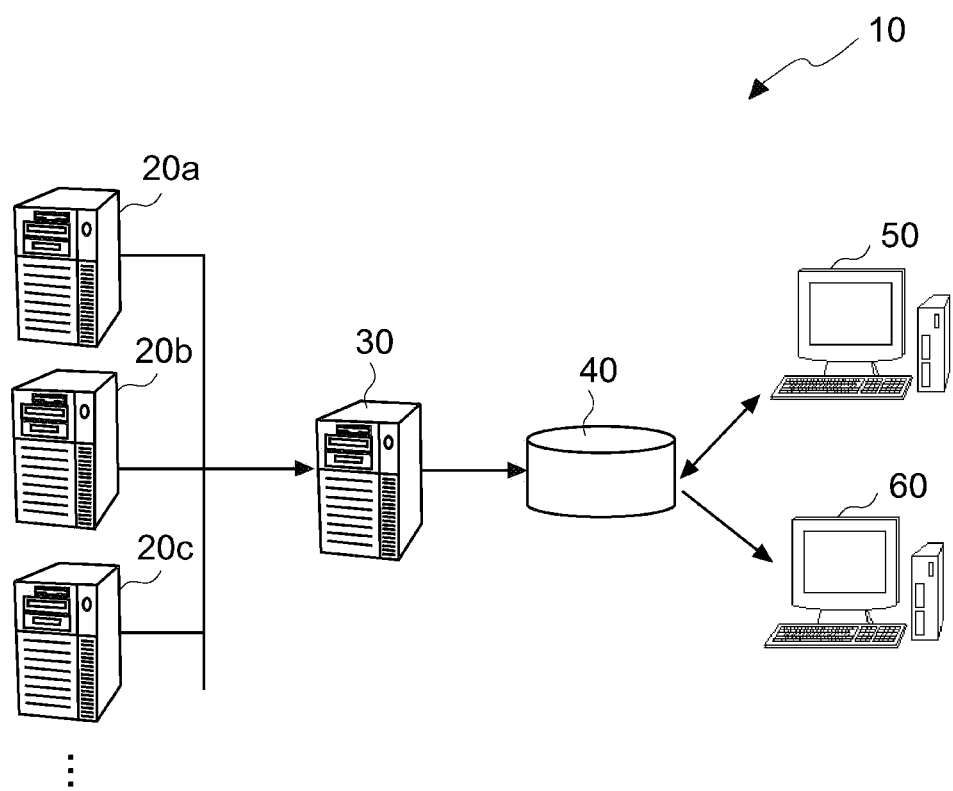
FIG. 1 is a schematic diagram illustrating an example of the constitution of an information processing system according to one or more embodiments of the present invention.

Hereinafter, embodiments of the present invention will be described with reference to the drawings. However, the scope of the invention is not limited to the illustrated embodiments.

As described in the above, behavioral characteristics, which are indicators indicating how one is likely to behave, can be used for retrieving a person of interest, and various kinds of method for determining the behavioral characteristics have been proposed. However, the proposed methods use information belonging to just one communication category, for example, records of incoming and outgoing emails, for determining the behavioral characteristics, and therefore, a use of such behavioral characteristics can fail to retrieve a person of interest.

Examples of information which can be obtained from records of incoming and outgoing emails, for determining the behavioral characteristics of a person, include the frequency of email communications of the person (the number of times the person receives or sends an email within a unit time period) and the number of contacted persons (the number of recipients designated in outgoing emails of the person). FIG. 21 illustrates an example of weightings for the frequency of email communications and the number of contacted persons (the number of recipients in the communications). As can be seen from the figure, an easy person to contact can be retrieved on the basis of the frequency of email communications, and a person expected to be important can be retrieved on the basis of the number of contacted persons (the number of recipients in the communications). However, the behavioral characteristics given by records of incoming and outgoing emails are merely given from a viewpoint of email communications without consideration for ease of contact by telephone call or face-to-face meeting, and therefore, such behavioral characteristics are insufficient to be used for retrieving a person of interest.

In view of that, in one or more embodiments of the present invention, the following operations are executed in an information processing system which includes a collection server, a storage device and an analysis server, where the collection server and the analysis server are each connected to the storage device. The collection server records, into the storage device, either or both of (1) multiple kinds of behavior history record (referred to as multiple kinds of behavior log) of each person and (2) multiple kinds of communication behavior (referred to as multiple kinds of communication information) of each person, where the multiple kinds of behavior log are obtained by the collection server, and the multiple kinds of communication information are given by processing the multiple kinds of behavior log by the collection server. The analysis server obtains, from the storage device, either or both of the multiple kinds of behavior log and the multiple kinds of communication information for each person, and determines at least one kind of behavioral characteristic of each person, which indicates a versatile behavioral tendency of a target person or how the person is likely to behave, by weighting and combining the either or both of the multiple kinds of behavior log of the each person and the multiple kinds of communication information of the each person. The analysis server then records the at least one kind of behavioral characteristic of each person into a database in the storage device in a form suitable for person retrieval so that an operator can retrieve a person of interest appropriately.

The analysis server may determine multiple kinds of behavioral characteristic for each person, and further may use the multiple kinds of behavioral characteristic to determine another kind of behavioral characteristic by weighting the multiple kinds of behavior characteristic of the each person by using predetermined weightings and combining the multiple kinds of behavior characteristic of the each person which were weighted. The analyses server may cause a display unit (e.g., a display) of itself to display a screen indicating the behavioral characteristics of persons graphically so as to allow an operator to choose one of the persons on the basis of the indicated behavioral characteristics. The information processing system may further include an application server connected to the storage device, and the application server may cause a display unit of itself to display a screen which allows an operator to input conditions for person retrieval. The application server further may retrieve one or more persons according to the conditions inputted on the screen, and cause the display unit to display a screen indicating the one or more retrieved persons so as to allow an operator to select one of the one or more retrieved persons on the screen.

As a concrete example, the analysis server may determine behavioral characteristics like "easy to contact" and "expected to be important" for each person, by weighting multiple kinds of information (behavior log and/or communication information) belonging to various categories of communications (for example, email communications, telephone calls and meetings) as illustrated in FIG. 22 and combining the multiple kinds of information which were weighted. Examples of the multiple kinds of communication information include the frequency of email communications and the number of contacted person (the number of recipients designated in emails) both given from email history of receiving and sending emails, the frequency of telephone calls given from telephone call history of incoming and outgoing telephone calls, and the frequency of speaking at a meeting (frequency that a person spoke at a meeting), given from meeting minutes. For example, the analysis server may determine a person who frequently communicated via not only email but also telephone call and spoke at a meeting more times than others, as a person expected to be easy to contact. The analysis server further may determine a person who sent emails in which a larger number of recipients were designated and further spoke at a meeting more times than others, as a person expected to be an important person.

A use of either or both of multiple kinds of behavior log and multiple kinds of communication information for obtaining behavioral characteristics, allows the analysis server to determine versatile behavioral characteristics for each person, which are hardly determined from one kind of behavior log like email history or records of incoming and outgoing emails. Further, a use of versatile behavioral characteristics allows the retrieval of a person of interest more efficiently.

Figure 11:
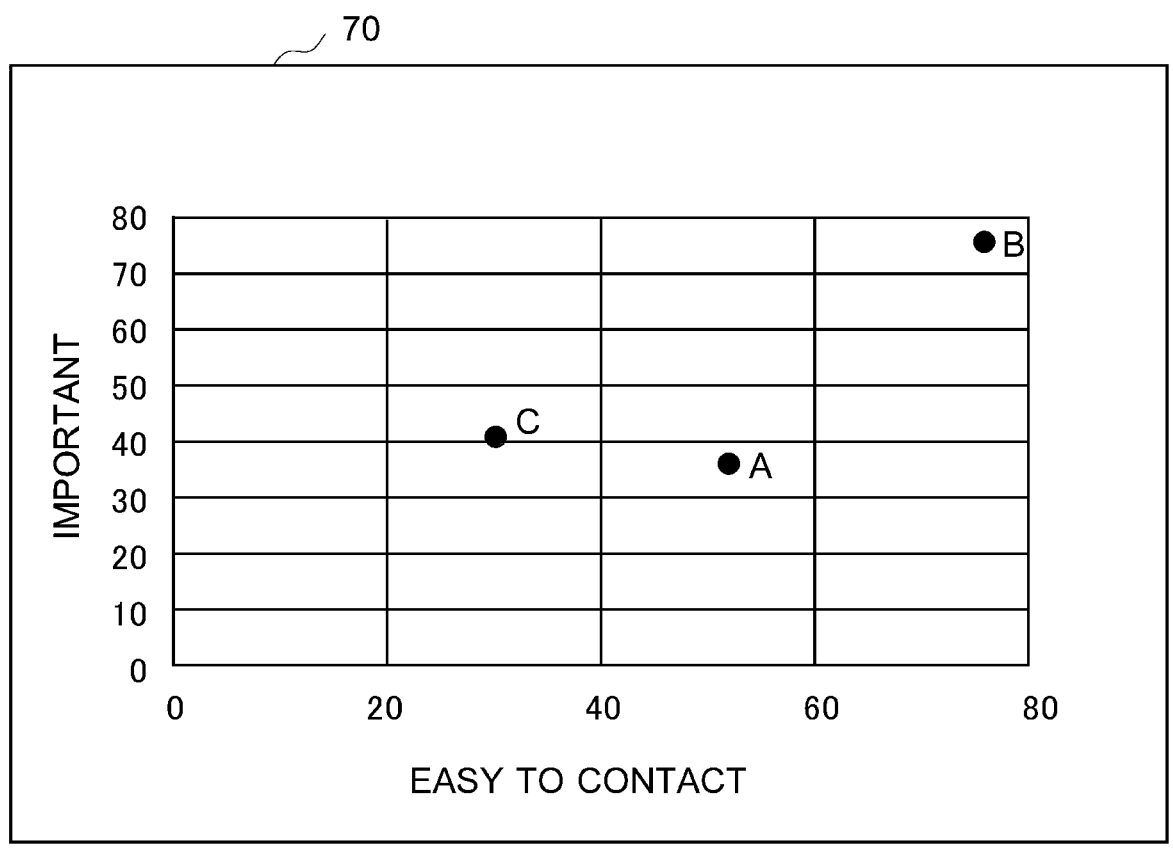
FIG. 11 is a diagram illustrating an example of a determination result screen of behavioral characteristics displayed on the analysis server according to one or more embodiments of the present invention.
Figure 12:
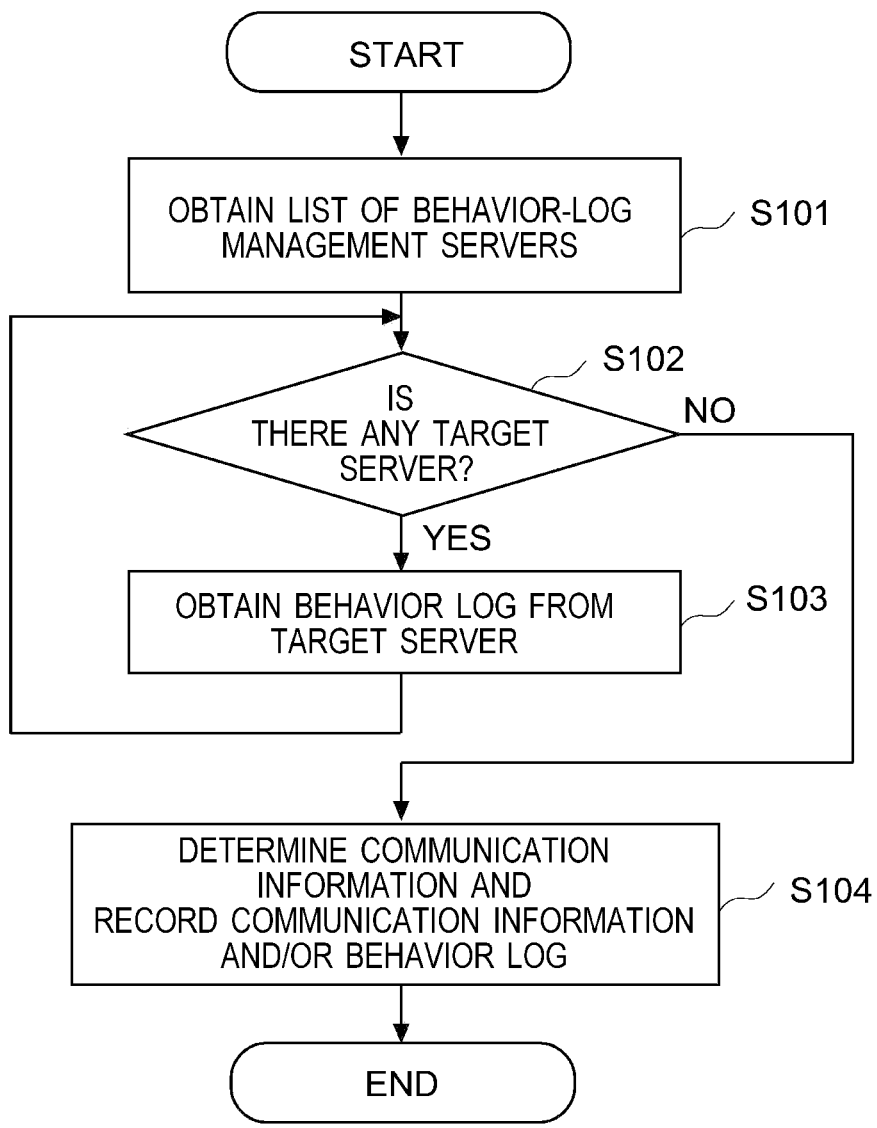
FIG. 12 is a flowchart illustrating an example of operations of the collection server according to one or more embodiments of the present invention.
Figure 15:
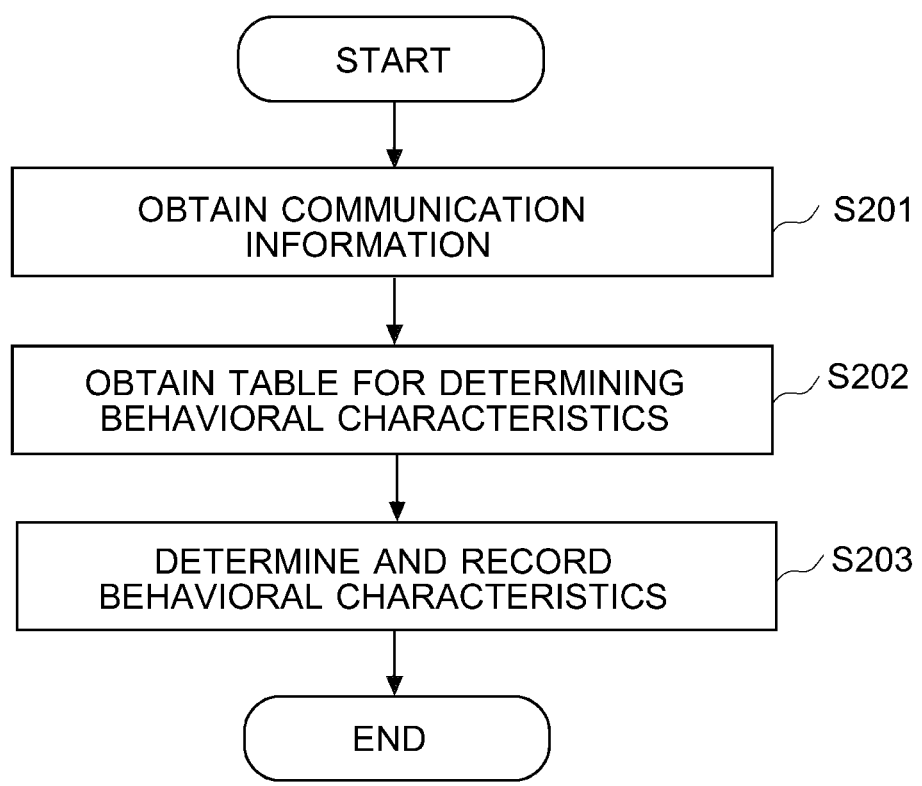
FIG. 15 is a flowchart illustrating an example of operations of the analysis server according to one or more embodiments of the present invention.

In order to describe one or more embodiments of the present invention in more in detail, a description is given to one example of a non-transitory medium storing an information processing program and an information processing method according to one or more embodiments of the present invention, with reference to FIGS. 1 to 20. FIG. 1 is a schematic diagram illustrating an example of the constitution example of an information processing system of the present example. FIGS. 2A and 2B, FIGS. 3A and 3B and FIGS. 4A and 4B are block diagrams illustrating a constitution example of a collection server, an analysis server and an application server of the present example, respectively. Each of FIGS. 5 to 10 illustrates an example of various kinds of information to be used by the information processing system of the present example. FIG. 11 is a diagram illustrating an example of a screen displayed on the analysis server. FIG. 12 is a flowchart illustrating operations of the collection server of the present example. FIG. 13 illustrates an example of a list of behavior-log management servers to be used by the collection server. FIG. 14 illustrates an example of a way to process behavior logs by the collection server. FIG. 15 is a flowchart illustrating operations of the analysis server of the present example. Each of FIGS. 16 and 17 illustrates a table for determining behavioral characteristics. FIG. 18 is a flowchart illustrating operations of the application server of the present example. Each of FIGS. 19 and 20 is a diagram illustrating a screen displayed on the application server.

Hereinafter, a record of behavior history of a person is referred to as a behavior log; information indicating an aspect of communication behavior of a person, given by processing a behavior log (for example, given by processing a behavior log by mathematical calculation or statistic calculation, or by analyzing a behavior log by natural language processing) is referred to as communication information; and information indicating behavioral tendencies of a person or how a person is likely to behave is referred to as behavioral characteristics.

As illustrated in FIG. 1, information processing system 10 of the present example includes behavior-log management servers 20 (see behavior-log management servers 20a, 20b, 20c . . . in FIG. 1), collection server 20, database storage device 40, analysis server 50 and application server 60. A description of each device is given below. BEHAVIOR-LOB MANAGEMENT SERVER:

Behavior-log management server 20 is a computing device configured to collect data to prepare a behavior log for each person. Examples of the behavior log of each person include email history of receiving and sending emails by each person, contents of emails of each person, telephone call history of incoming and outgoing telephone calls of each person, contents of telephone calls of each person, meeting minutes, a record of positional information of each person (including attendance of the person at meetings and events, and positional information such as GPS (Global Positioning System) information of the person), and a record of information of a post of each person (information about the person's organization shown in a business card). These behavior logs are prepared by various behavior-log management servers 20. For example, email history and email contents are prepared by a mail server; telephone call history and telephone call contents are prepared by a telephone management system; meeting minutes are prepared by a mail server or a meeting-minute management system; a record of person's positional information is prepared by a mail server or a GPS server; and a record of information of a person's post is prepared by a business-card management system. In the disclosed information processing system, behavior-log management servers 20 prepare multiple kinds of behavior log belonging to various categories, such as emails, telephone calls, meetings, positional information, post information and others.
Collection Server:

Collection server 30 is a computing device configured to collect multiple kinds of behavior log and determine multiple kinds of communication information, for each person. As illustrated FIG. 2A, collection server 30 includes control unit 31, storage unit 35 and network interface (I/F) unit 36.

Figure 2A:
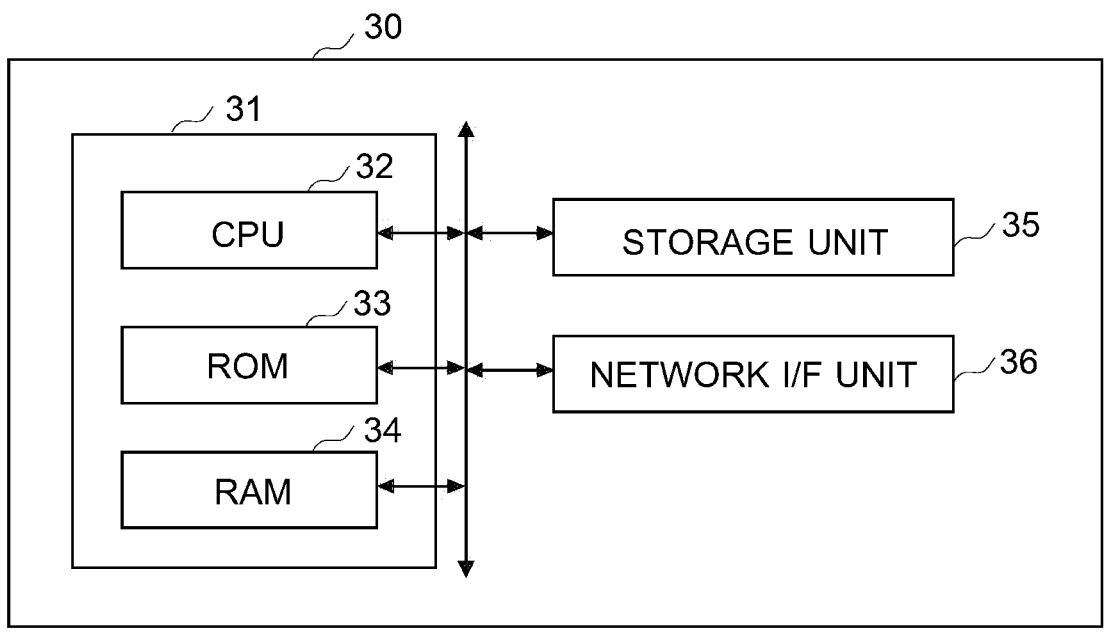
FIGS. 2A and 2B are schematic diagrams illustrating an example of the constitution of a collection server according to one or more embodiments of the present invention.
Figure 2B:
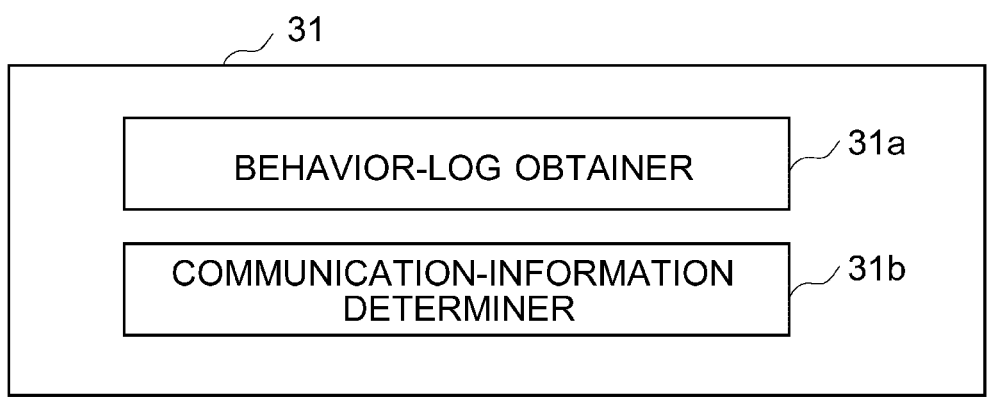

Control unit 31 includes CPU (Central Processing Unit) 32 and memories, such as ROM (Read Only Memory) 33 and RAM (Random Access Memory) 34. CPU 32 reads control programs stored in ROM 33 or storage unit 35 to load the control programs onto RAM 34, and then executes the control programs, thereby controlling the overall operations of collection server 30. The control unit 31 (CPU 32) is further configured to serve as behavior-log obtainer 31a and communication-information determiner 31b, as illustrated in FIG. 2B.

Behavior-log obtainer 31a is configured to execute the following operations. Behavior-log obtainer 31a obtains, from database storage device 40, a list of behavior-log management servers, and uses the list of behavior-log management servers to obtain, from various kinds of behavior-log management server (for example, an above-described mail server, telephone management system, meeting-minute management system, GPS server and business-card management system), multiple kinds of behavior log of each person (for example, an above-described email history, email contents, telephone call history, telephone call contents, meeting minutes, a record of person's positional information and a record of information of a person's post). Behavior-log obtainer 31a then sends the multiple kinds of behavior log obtained for each person, to communication-information determiner 31b, and stores the multiple kinds of behavior log obtained for each person into database storage device 40.

Communication-information determiner 31b is configured to execute the following operations. Communication-information determiner 31b processes data in the multiple kinds of behavior log to determine multiple kinds of communication information for each person, and then stores the determined communication information into database storage device 40. Examples of the communication information of each person include the frequency of receiving and sending emails by the each person, the number of recipients designated in emails of the each person, and response time that the each person took to respond to an incoming email, which are determined from email history of the each person; a predetermined character string extracted from contents of emails of the each person; the frequency of incoming and outgoing telephone calls of the each person and response time that the each person took to respond to an incoming telephone call, which are determined from telephone call history of the each person; a predetermined character string extracted from contents of telephone calls of the each person; the frequency of attendance of the each person at meetings, the frequency that the each person spoke at a meeting, a period of time that the each person spoke at a meeting, and a predetermined character string extracted from contents of what the each person spoke at meetings, which are determined from meeting minutes; information about meetings with another person (the frequency that the each person attends at a meeting or event), which are determined from a record of positional information of the each person; and information of a structure of an organization that the each person belongs to, determined from a record of information of a post of the each person. If there is no need to process the obtained behavior log for obtaining communication information, communication-information determiner 31b may use the behavior log as it is for communication information, without processing the behavior log.

Storage unit 35 includes a memory, such as a HDD (Hard Disk Drive), a SSD (Solid State Drive) or the like, storing programs which, when being executed, cause CPU 32 to control the components of collection server 30, various kinds of behavior log, various kinds of communication information and other data.

Network I/F unit 36 includes a NIC (Network Interface Card) and/or a modem. The network I/F unit 36 communicatively connects collection server 30 to behavior-log management servers 20 and database storage device 40.
Database Storage Device:

Database storage device 40 is a storage device configured to store a database and various kinds of information to be used by collection server 30, analysis server 50 and application server 60. Database storage device 40 is configured to store a list of behavior-log management servers to be used for obtaining behavior logs by collection server 30 from behavior-log management servers 20; various kinds of behavior log and various kinds of communication information of persons received from collection server 30; a table for determining behavioral characteristics for use in determination of behavior characteristics from multiple kinds of communication information; behavior characteristics of persons received from analysis server 50, and other information. Database storage device 40 is configured to further store information of persons to be used for person retrieval executed by application server 60. Those may be stored in database storage device 40 in a form of database, and in especial, the various kinds of behavior log, various kinds of communication information and behavior characteristics of persons and the information of persons may be stored in database storage device 40 as a database in a form suitable for person retrieval. Database storage device 40 is further configured to provide the stored data and information to collection server 30, analysis server 50 and application server 60.

Figure 3A:
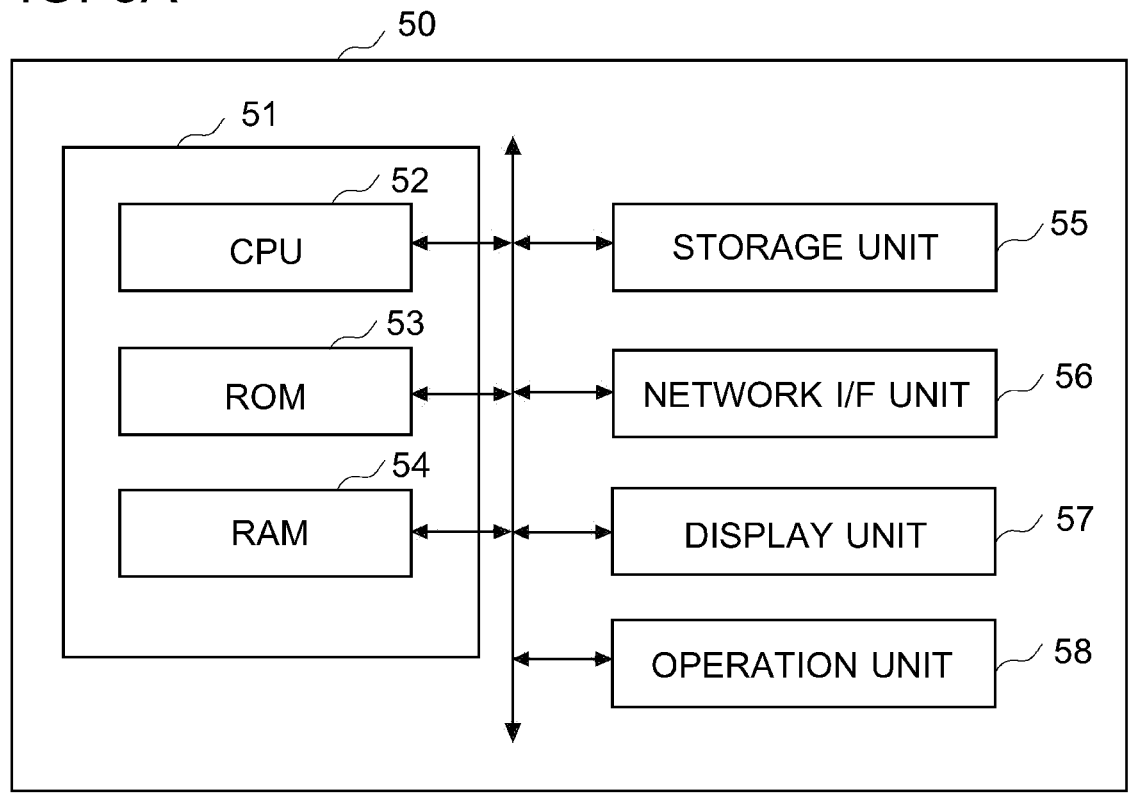
FIGS. 3A and 3B are schematic diagrams illustrating an example of the constitution of an analysis server according to one or more embodiments of the present invention.

Analysis Server:

Analysis server 50 is a computing device configured to determine at least one kind of behavioral characteristic of each person, and includes control unit 51, storage unit 55, network interface (I/F) unit 56, display unit 57 and operation unit 58, as illustrated in FIG. 3A.

Figure 3B:
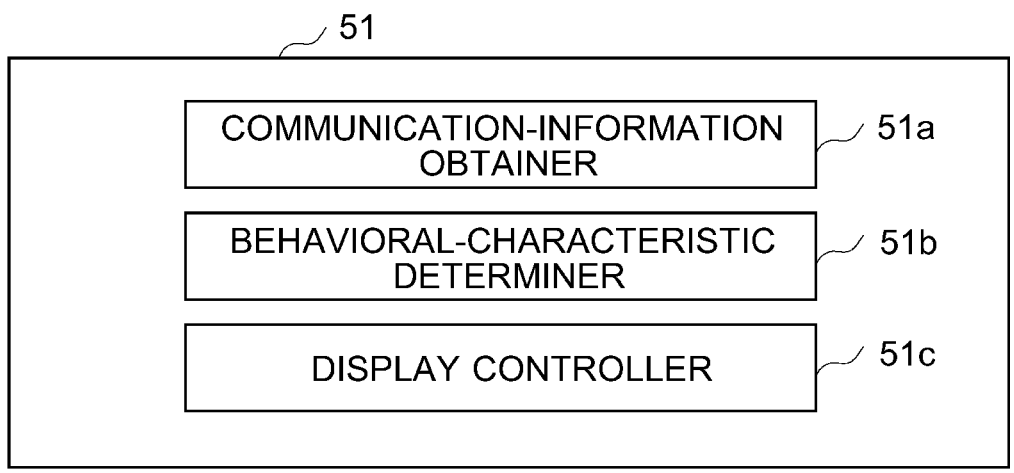

Control unit 51 includes CPU 52 and memories, such as ROM 53 and RAM 54. CPU 52 reads control programs stored in ROM 53 or storage unit 55 to load the control programs onto RAM 54, and then executes the control programs, thereby controlling the overall operations of analysis server 50. The control unit 51 (CPU 52) is further configured to serve as communication-information obtainer 51a, behavioral-characteristics determiner 51b and display controller 51c, as illustrated in FIG. 3B.

Communication-information obtainer 51a is configured to obtain multiple kinds of communication information of each person from database storage device 40. As described above, examples of the communication information of each person obtained from database storage device 40 include the frequency of receiving and sending emails by the each person, the number of recipients designated in emails of the each person, response time that the each person took to respond to an incoming email, a predetermined character string extracted from contents of emails of the each person, the frequency of incoming and outgoing telephone calls of the each person, response time that the each person took to respond to an incoming telephone call, a predetermined character string extracted from contents of telephone calls of the each person, the frequency of attendance of the each person at meetings, the frequency that the each person spoke at a meeting, a period of time that the each person spoke at a meeting, a predetermined character string extracted from contents of what the each person spoke at meetings, information about meetings with another person, and information of a structure of an organization that the each person belongs to. If an obtained behavior log or logs can be used as it is, for determining behavioral characteristics, communication-information obtainer 51a may use the obtained behavior log or logs as the communication information.

Behavioral-characteristics determiner 51b is configured to execute the following operations. On the basis of the multiple kinds of communication information of each person, obtained by communication-information obtainer 51a, behavioral-characteristics determiner 51b refers to a table for determining behavioral characteristics stored in database storage device 40 or storage unit 55, to determine at least one kind of behavioral characteristic of each person, which indicates a behavioral tendency of the each person or how the each person is likely to behave, and stores the determined behavioral characteristics into a database in database storage device 40 in a form suitable for person retrieval. Examples of the behavioral characteristics of each person include communication ability of the each person, representing the person's communication skills; a way to give a response frequently used by the each person, representing which way of email and telephone call is frequently used by the person to give a response; expected response time that the each person is likely to take to give a response, representing how quick the person is expected to give a response; the degree of politeness in communications of the each person, representing whether the person is expected to be polite in communications; the degree of closeness in communications of the each person, representing whether the person is expected to be easy to contact; and the degree of gentleness in communications of the each person, representing whether the person is expected to have a gentle manner toward others.

Display controller 51c is configured to cause display unit 57 to display various kinds of screen including a screen for presenting an operator the behavioral characteristics of persons, determined by behavioral-characteristics determiner 51b (a determination result screen of behavioral characteristics which will be described below).

The communication-information obtainer 51a, behavioral-characteristic determiner 51b and display controller 51c may be constituted as hardware devices. Alternatively, the communication-information obtainer 51a, behavioral-characteristic determiner 51b and display controller 51c (in particular, communication-information obtainer 51a and behavioral-characteristic determiner 51b) may be provided by an information processing program which causes the control unit 51 to function as these components when being executed by CPU 52. That is, the control unit 51 may be configured to serve as the communication-information obtainer 51a, behavioral-characteristics determiner 51b and display controller 51c (in particular, communication-information obtainer 51a and behavioral-characteristics determiner 51b), when CPU 52 executes the information processing program.

Storage unit 55 includes a memory, such as a HDD, a SSD or the like, storing programs which, when being executed, cause CPU 52 to control the components of analysis server 50, various kinds of communication information, various kinds of behavior log, a table for determining behavioral characteristics, behavioral characteristics and other data.

Network I/F unit 56 includes a NIC and/or a modem. The network I/F unit 56 communicatively connects analysis server 50 to database storage device 40.

Display unit 57 includes a display like a LCD (Liquid Crystal Display) or an OEL (organic electroluminescence) display, and is configured to display various kinds of screen like a determination result screen of behavioral characteristics.

Operation unit 58 includes input hardware devices, such as a mouse and a keyboard, and is configured to receive operator' operations, for example, to choose one of persons indicated on the determination result screen of behavioral characteristics.

Figure 4A:
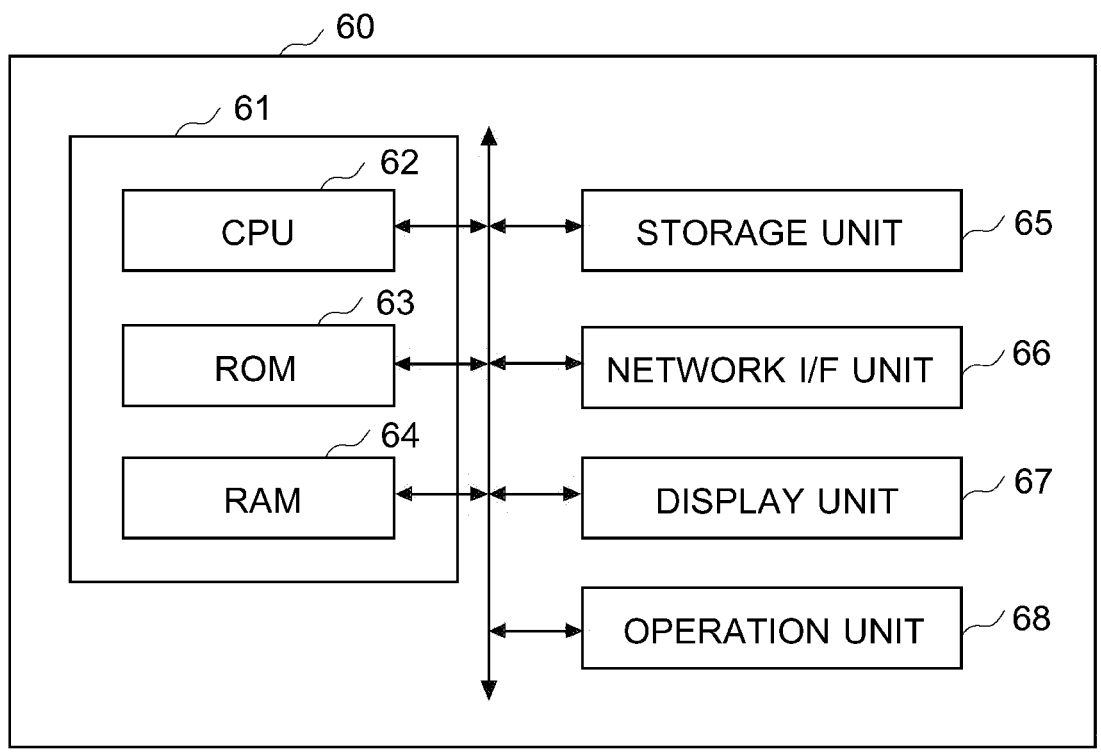
FIGS. 4A and 4B are schematic diagrams illustrating an example of the constitution of an application server according to one or more embodiments of the present invention.
Figure 4B:
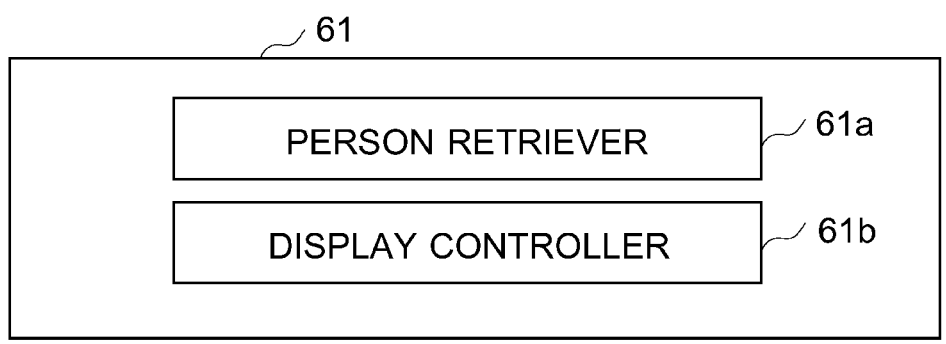

Application Server:

Application server 60 is a computing device configured to execute person retrieval, and includes control unit 61, storage unit 65 network interface (I/F) unit 66, display unit 67 and operation unit 68, as illustrated in FIG. 4A Control unit 61 includes CPU 62 and memories, such as ROM 63 and RAM 64. CPU 62 reads control programs stored in ROM 63 or storage unit 65 to load the control programs onto RAM 64, and then executes the control programs, thereby controlling the overall operations of application server 60. The control unit 61 (CPU 62) is further configured to serve as person retriever 61*a* and display controller 61*b*, as illustrated in FIG. 4B.

Person retriever 61*a* is configured to execute the following operations. On the basis of retrieval conditions inputted by an operator on a screen for inputting retrieval conditions which will be described later, person retriever 61*a* combines multiple kinds of behavioral characteristic to create a retrieval formula to be used for retrieving persons that match the conditions. Person retriever 61*a* then retrieves persons of interest from a database of persons recorded in advance in database storage device 40, on the basis of the created retrieval formula.

Display controller 61*b* is configured to cause display unit 67 to display various kinds of screen including a screen which allows an operator to input retrieval conditions (a screen for inputting retrieval conditions which will be described later) and a screen for presenting an operator a retrieved result (a retrieval result screen which will described below).

The person retriever 61*a* and display controller 61*b* may be constituted as hardware devices. Alternatively, the person retriever 61*a* and display controller 61*b* may be provided by an information processing program which causes the control unit 61 to function as these components when being executed by CPU 62. That is, the control unit 61 may be configured to serve as the person retriever 61*a*, and display controller 61*b*, when CPU 62 executes the information processing program.

Storage unit 65 includes a memory, such as a HDD, a SSD or the like, storing programs which, when being executed, cause CPU 62 to control the components of application server 60 and various kinds of information.

Network I/F unit 66 includes a NIC and/or a modem. The network I/F unit 66 communicatively connects application server 60 to database storage device 40.

Display unit 67 includes a display like a LCD or an OEL display, and is configured to display various kinds of screen including the screen for inputting retrieval conditions and the retrieval result screen.

Operation unit 68 includes input hardware devices, such as a mouse and a keyboard, and is configured to receive operator's operations including operations to input retrieval conditions on the screen for inputting retrieval conditions and operations to choose one of persons indicated on the retrieval result screen.

It should be noted that FIG. 1 to FIG. 4B illustrate information processing system 10 of the present example for illustrative purpose only, and the constitution and control of each device in the information processing system 10 may be modified appropriately. For example, FIG. 1 illustrates the constitution of information processing system 10 such that behavior-log management servers 20 are connected to collection server 30, collection server 30 is connected to database storage device 40, and analysis server 50 and application server 60 are each connected with database storage device 40. Alternatively, behavior-log management servers 20, collection server 30, database storage device 40, analysis server 50 and application server 60 are communicatively connected to each other via a communication network, where examples of the communication network include a LAN (Local Area Network) and a WAN (Wide Area Network), conforming to a standard, for example, Token Ring, or FDDI (Fiber-Distributed Data Interface) and the like.

FIG. 1 further illustrates the constitution of information processing system 10 including one collection server 30, one database storage device 40, one analysis server 50 and one application server 60. Alternatively, information processing system 10 may include plural collection servers 30, plural database storage device 40, plural analysis servers 50 and plural application servers 60. FIG. 1 further illustrates the constitution of information processing system 10 such that collection server 30, analysis server 50 and application server 60 are provided as separated servers. Alternatively, information processing system 10 may include a server which serves as two of these servers. For example, the collection server 30 and analysis server 50 may be provided as one apparatus and analysis server 50 and application server 60 may be provided as one apparatus. FIG. 1 further illustrates the constitution of the information processing system 10 such that database storage device 40 is provided as an individual device, but the database storage device 40 may be included in collection server 30 or analysis server 50.

Hereinafter, a description is given to the operations of information processing system 10 of the present example. In the following operations, a person having a behavior characteristic of "easy to contact", which is one of behavior characteristics indicating "the degree of closeness in communications", is retrieved.

First, each of behavior-log management servers 20 (including a mail server, a telephone management system, a meeting-minute management system, a GPS server, business-card management system and the like) collects data to prepare a corresponding behavior log for each person (email history of receiving and sending emails, contents of emails, telephone call history of incoming and outgoing telephone calls, contents of telephone calls, meeting minutes, a record of person's positional information, and a record of information of a person's post). Collection server 30 collects multiple kinds of behavior log (in this case, email history, telephone call history and meeting minutes) of each person, from behavior-log management servers 20 (in this case, a mail server, a telephone management system and a meeting-minute management system).

Next, using the multiple kinds of behavior log of each of persons (in this case, persons A, B and C), collection server 30 determines multiple kinds of communication information of each person and records the multiple kinds of communication information of each person into database storage device 40, where the multiple kinds of communication information includes the number of incoming and outgoing emails per day (frequency of email communications per day), the number of incoming and outgoing telephone calls per day (frequency of telephone calls per day) and the number of times the each person spoke at a meeting (frequency of speaking per meeting). FIG. 5 illustrates an example of the multiple kinds of communication information of each person, determined by collection server 30.

Analysis server 50 then refers to a table for determining behavioral characteristics stored in advance in database storage device 40. FIG. 6 illustrates an example of the table. The table for determining behavioral characteristics includes weightings for multiple kinds of communication information (in this case, "the frequency of email communications" determined from "email history", "the frequency of telephone calls" determined from "telephone call history" and "the frequency of speaking at a meeting" determined from "meeting minutes"), to be used for determining the behavioral characteristics (in this case, each of "easy to contact" and "expected to be important"). Analysis server 50 then weights the multiple kinds of communication information of each person according to the table for determining behavioral characteristics, and determines behavioral characteristics for each person. FIG. 7 illustrates a table of the determination result of the behavioral characteristics. The values of "easy to contact" as one kind of behavioral characteristic are given by the following expressions (1) to (3) for persons A to C, respectively, by using the frequency of email communications (email frequency), the frequency of telephone calls (phone call frequency), the frequency of speaking at a meeting (speaking frequency) and the corresponding weightings. As can be seen from the determination result, the easiest person to contact are, in order, person B, person A and person C. Analysis server 50 then records the determination result into a database in database storage device 40.

$$10(\text{email frequency}) \times 4 + 2(\text{phone call frequency}) \times 4 + 2(\text{speaking frequency}) \times 2 = 52 \quad (1)$$

$$5(\text{email frequency}) \times 4 + 10(\text{phone call frequency}) \times 4 + 8(\text{speaking frequency}) \times 2 = 76 \quad (2)$$

$$1(\text{email frequency}) \times 4 + 4(\text{phone call frequency}) \times 4 + 5(\text{speaking frequency}) \times 2 = 30 \quad (3)$$

The above description gave a way to determine one kind of behavioral characteristic for each person, to be used for person retrieval. A use of combination of multiple kinds of behavioral characteristic makes person retrieval more flexibly. For example, to determine "important and easy to contact" as one kind of complex behavioral characteristic, analysis server 50 may add the given values of two kinds of behavioral characteristic ("easy to contact" and "expected to important") for each person, as illustrated in FIG. 8.

In place of adding the given values of two kinds of behavioral characteristics for each person, for determining "important and easy to contact" as one kind of complex behavioral characteristic, analysis server 50 may weight the values of two kinds of behavioral characteristics for each person and add the weighted values of behavioral characteristics for each person, for determining one kind of complex behavioral characteristic more flexibly. FIG. 9 illustrates an example of the table for determining behavioral characteristics, which includes weightings for multiple kinds of behavioral characteristic, to be used for determining complex behavioral characteristics. Analysis server 50 weights the multiple kinds of behavioral characteristic by using the weightings in the table of FIG. 9 and combining (adding) the weighted behavioral characteristics, for each person, to determine another kind of behavioral characteristics ("important and easy to contact") of persons A to C. FIG. 10 illustrates a table of the determination result of the behavioral characteristics of each person. The values of "important and easy to contact" as one kind of complex behavioral characteristic are given by the following expressions (4) to (6) for persons A to C, respectively, by using the values of "easy to contact" and "expected to be important" and the corresponding weightings.

$$52(\text{easy to contact}) \times 4 + 36(\text{estimated to be important}) \times 6 = 424 \quad (4)$$

$$76(\text{easy to contact}) \times 4 + 76(\text{estimated to be important}) \times 6 = 760 \quad (5)$$

$$30(\text{easy to contact}) \times 4 + 41(\text{estimated to be important}) \times 6 = 366 \quad (6)$$

After determining the behavioral characteristics of each person by using any of the above-described ways, analysis server 50 causes, as needed, display unit 57 to display a screen indicating the behavioral characteristics of persons graphically so as to present an operator the relations of the multiple kinds of behavioral characteristic of the persons, and allows an operator to choose one of the persons on the basis of the indicated behavioral characteristics. FIG. 11 illustrates an example of a determination result screen 70 indicating the determination result of the behavioral characteristics in the table of FIG. 8, where the vertical axis indicates values of "expected to be important" as one kind of the behavioral characteristic and the transverse axis indicates values of "easy to contact" as another kind of behavioral characteristic. Indicating the determination result of the behavioral characteristics graphically, allows an operator to choose a person of interest from the indicated persons easily.

Operations of Collection Server:

Hereinafter, a description is given to the operations of each server of the present example. First, a description of the operations of collection server 30 is given with reference to the flowchart illustrated in FIG. 12. In the following description, it is assumed that collection server 30 collects behavior logs from behavior-log management servers 20 periodically.

Control unit 31 (behavior-log obtainer 31a) of collection server 30 obtains a list of behavior-log management servers 20 from which control unit 31 retrieves behavior logs, from database storage device 40 (Step S101). FIG. 13 illustrates an example of the list of behavior-log management servers 20, where information of "OBTAINED DATE" indicates dates and times control unit 31 obtained the behavior logs from the behavior-log management servers 20, information of "ADDRESS" indicates network IP (Internet Protocol) addresses of the behavior-log management servers 20, and information of "KIND OF BEHAVIOR LOG" indicates the kinds of behavior log obtained by the behavior-log management servers 20.

Control unit 31 (behavior-log obtainer 31a) then determines whether there is target behavior-log management server 20 (behavior-log management servers 20 from which a behavior log has not been obtained yet) (Step S102). In this process, control unit 31 (behavior-log obtainer 31a) may determine whether a behavior log has already been obtained from each of behavior-log management servers 20, on the basis of the information of "OBTAINED DATE" in the list of behavior-log management servers illustrated in FIG. 13. When determining that there is target behavior-log management server 20 (Yes in Step S102), control unit 31 (behavior-log obtainer 31a) uses the information of "ADDRESS" in the list of behavior-log management servers illustrated in FIG. 13, to access the behavior-log management server 20, and then obtains a behavior log for each person from the behavior-log management server 20 (Step S103). Returning to Step S102, control unit 31 (behavior-log obtainer 31a) repeats the above-described operations.

When determining that there is no target behavior-log management server 20 (No in Step S102), control unit 31 (communication-information determiner 31b) process the behavior logs to determine multiple kinds of communication information for each person, and records the multiple kinds of communication information determined for each person into database storage device 40 (Step S104). If there is no need to determine communication information from the behavior logs for determining behavioral characteristics later, control unit 31 (communication-information determiner 31b) may record the behavior logs into database storage device 40, in place of or additionally to the communication information. Since the way to determine the communication information depends on the kind of behavior log, control unit 31 (communication-information determiner 31*b*) changes the way to determine the communication information according to the information of "KIND OF BEHAVIOR LOG" in the list of behavior-log management servers 20 illustrated in FIG. 13. FIG. 14 illustrates an example of a way to process the behavior logs in a form suitable for determination of communication information.
Operations of Analysis Server:

Next, a description of the operations of analysis server 50 is given. CPU 52 reads an information processing program stored in ROM 53 or storage unit 55, loads the program onto RAM 54, and executes the program, thereby executing steps of the flowchart illustrated in FIG. 15.

Control unit 51 (communication-information obtainer 51*a*) of analysis server 50 obtains multiple kinds of communication information (and/or multiple kinds of behavior log) from database storage device 40, for each person (Step S201). Next, control unit 51 (behavioral-characteristic determiner 51*b*) obtains a table for determining behavioral characteristics (a table which associates behavioral characteristics with communication information) from database storage device 40 (Step S202). FIG. 16 illustrates an example of the table which associates behavioral characteristics with communication information, where the table include information that which kinds of communication information are necessary for determining each kind of behavioral characteristic. In the present example, every kind of the behavioral characteristic is determined by using multiple kinds of communication information, and the table of FIG. 16 shows multiple kinds of communication information for each behavioral characteristics.

Control unit 51 (behavioral-characteristic determiner 51*b*) then uses the multiple kinds of communication information (and/or multiple kinds of behavior logs if the behavior logs can be used as communication information) and the table for determining behavioral characteristics obtained from database storage device 40, to determine at least one kind of behavioral characteristic for each person, and records the determined behavioral characteristics into a database in database storage device 40 in a form suitable for person retrieval (Step S203). Control unit 51 (display controller 51*c*) causes display unit 57 to display determination result screen 70 indicating the determined behavioral characteristics of persons as illustrated in FIG. 11, as needed. On determining one kind of behavioral characteristic of a person, control unit 51 (behavioral-characteristic determiner 51*b*) uses the multiple kinds of communication information of the person associated with the one kind of behavioral characteristic in the table for determining behavioral characteristics as illustrated in FIG. 16, to determine the behavioral characteristics according to a predetermined determination algorithm. Two examples of the determination of the behavioral characteristics are given below.
First Example of the Determination:

A description is given of the first example of determination of the following kinds of behavioral characteristic of each person: communication ability, a way to give a response frequently used (the frequently-used way of a person to respond), expected response time that a person is likely to take to give a response, the degree of politeness in communications, the degree of closeness in communications, and the degree of gentleness in communications.

On determining the communication ability of each person, control unit 51 (behavioral-characteristic determiner 51*b*) uses the frequency of receiving and sending emails by the each person (email frequency), the frequency of incoming and outgoing telephone calls of the each person (phone call frequency) and the frequency that the each person spoke at a meeting (frequency of speaking at a meeting), to determine the level of communication ability of the each person.

On determining the frequently-used way of each person to respond, control unit 51 (behavioral-characteristic determiner 51*b*) compares the frequency of receiving and sending emails by the each person (email frequency) with the frequency of incoming and outgoing telephone calls of the each person (phone call frequency), to determine which of email and phone call is frequently used by the each person to give a response.

On determining the expected response time of each person, control unit 51 (behavioral-characteristic determiner 51*b*) uses response time the each person took to respond to an incoming email (email response time) and response time the each person took to respond to an incoming telephone call (phone call response time), to determine how quick the each person is likely to give a response.

On determining the degree of politeness in communications of each person, control unit 51 (behavioral-characteristic determiner 51*b*) executes well-known natural language processing on the contents of emails of the each person (email contents), the contents of telephone calls of the each person (phone call contents) and the contents of what the each person spoke at meetings (contents of speaking at meetings), to capture a predetermined character string, and determines formality and politeness of the expression (checks an existence of a certain expression represented by a predetermined character string) to determine whether the each person is expected to be polite in communications.

On determining the degree of closeness of each person, control unit 51 (behavioral-characteristic determiner 51*b*) uses the frequency of receiving and sending emails by the each person (email frequency), frequency of incoming and outgoing telephone calls of the each person (phone call frequency) and the frequency of attendance of the each person at meetings (frequency of meeting attendance), to determine whether the each person is expected to be easy to contact.

On determining the degree of gentleness in communications of each person, control unit 51 (behavioral-characteristic determiner 51*b*) executes well-known natural language processing on the contents of emails of the each person (email contents), the contents of telephone calls of the each person (phone call contents), and the contents of what the each person spoke at meetings (contents of speaking at meetings), to capture a predetermined character string, analyzes the person's feelings on the basis of the character string, and determines whether the each person is expected to be gentle in communications or not.
Second Example of the Determination:

To determine the behavioral characteristics of each person in the second example, control unit 51 (behavioral-characteristic determiner 51*b*) uses a table for determining behavioral characteristics as illustrated in FIG. 17 to weight multiple kinds of communication information of each person and add up the multiple kinds of communication information which have been weighted.
Operations of Application Server:

Next, a description of the operations of application server 60 is given. CPU 62 reads an information processing program stored in ROM 63 or storage unit 65, loads the program onto RAM 64, and executes the program, thereby executing steps of the flowchart illustrated in FIG. 18.

Control unit 61 (display controller 61b) of application server 60 causes display unit 67 to display a screen for inputting retrieval conditions and prompts an operator to input retrieval conditions (Step S301). FIG. 19 illustrates an example of screen 71 for inputting retrieval conditions, where the screen includes several fields for inputting retrieval conditions, which allow an operator to input various kinds of condition for retrieving a person of interest, and a "SEARCH" button which allows an operator to instruct to start person retrieval based on the retrieval conditions. In concrete terms, the screen allows an operator to input the domain name (the name of the organization that a person of interest belongs to) and the post name (for example, the name of department or section) of a person of interest in the organization, and to input or chose several kinds of behavioral characteristic of a person of interest.

In response to receiving the operator's instructions to start person retrieval, control unit 61 (person retriever 61a) retrieves persons that belong to the domain and the post designated on the screen for inputting retrieval conditions, from a database of persons in database storage device 40, and extracts, from the retrieved persons, a predetermined number of persons who have highest values of the designated kinds of behavioral characteristic on the screen (Step S302).

Control unit 61 (display controller 61b) then causes display unit 67 to display a retrieval result screen (Step 303). As one example of the screen, FIG. 20 illustrates retrieval result screen 72 which indicates the predetermined number of retrieved persons and optionally their email addresses and telephone numbers, in order of the total sum of the values of the designated kinds of behavioral characteristic. When the number of the retrieved persons is less than a predetermined number, the screen indicates all the retrieved persons.

As described above, a use of multiple kinds of communication information determined from multiple kinds of behavior log (and/or multiple kinds of behavior log) to determine at least one kind of behavioral characteristic for each person in the information processing system 10, allows to provide versatile behavioral characteristics. Further, a use of such behavioral characteristics for person retrieval allows to find out a person of interest.

The present invention should not be limited to the description of one or more embodiments in the above-mentioned examples, and the constitution and control of each of the servers may be modified appropriately unless the modification deviates from the intention of the present invention.

For example, the above-mentioned examples employ, as behavior-log management servers 20, a mail server, a telephone management system, a meeting-minute management system, a GPS server and a business-card management system; and employ, as multiple kinds of behavior log, email history, contents of emails, telephone call history, contents of telephone calls, meeting minutes, a record of positional information of a person, and a record of information of a post of a person, for illustrative purpose only. Arbitrary types of servers and arbitrary behavior logs, from which versatile behavioral characteristics can be determined, may be employed in place of or in addition to the disclosed servers and the disclosed behavior logs.

For another example, the above-mentioned examples employ, as multiple kinds of communication information, the frequency of receiving and sending emails by a person, the number of recipients designated in emails of a person, response time that a person took to respond to an incoming email, a predetermined character string extracted from contents of emails of a person, the frequency of incoming and outgoing telephone calls of a person, response time that a person took to respond to an incoming telephone call, a predetermined character string extracted from contents of telephone calls of a person, the frequency of attendance of a person at meetings, the frequency that a person spoke at a meeting, period of time that a person spoke at a meeting, a predetermined character string extracted from contents of what a person spoke at meetings, information about meetings with another person, and information of a structure of an organization that a person belongs to, for illustrative purpose only. Arbitrary kinds of communication information, from which versatile behavioral characteristics can be determined, may be employed in place of or in addition to the disclosed communication information.

For another example, the above-mentioned examples employ, as behavioral characteristics, communication ability of a person, a way to give a response frequently used by a person, expected response time that a person is likely to take to give a response, the degree of politeness in communications of a person, the degree of closeness in communications of a person, and the degree of gentleness in communications of a person, for illustrative purpose only. Arbitrary kinds of behavioral characteristics, by which a person of interest can be retrieved appropriately, may be employed in place of or in addition to the disclosed behavioral characteristics.

The present invention is applicable to information processing programs which allow the retrieval of a person of interest on the basis of versatile behavioral characteristics, non-transitory recording media each storing the information processing program and information processing methods for the person retrieval.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A non-transitory recording medium storing a computer-readable program for information processing executed in a computing device connected to a storage device, the program comprising instructions which, when executed by a hardware processor of the computing device, the computing device to execute:
   obtaining, from the storage device, either or both of:
      multiple kinds of behavior logs for each person that include multiple kinds of behavior history records of the each person; and
      multiple kinds of communication information for the each person that indicate plural aspects of communication behavior of the each person given by processing the multiple kinds of behavior logs;
   determining at least one kind of behavioral characteristic of the each person that indicates how the each person is likely to behave by:
      weighting either or both of the multiple kinds of behavior logs for the each person and the multiple kinds of communication information for the each person using predetermined weightings; and
      combining either or both of the multiple kinds of behavior logs for the each person and the multiple kinds of communication information for the each person that were weighted; and recording the at least one kind of behavioral characteristic of the each person into a database in the storage device.

2. The non-transitory recording medium of claim 1, wherein the determining includes determining multiple kinds of behavioral characteristics for the each person.

3. The non-transitory recording medium of claim 2, wherein the determining includes:
weighting the multiple kinds of behavior characteristics using the predetermined weightings, and
combining the multiple kinds of behavior characteristics that were weighted to determine another kind of behavior characteristic.

4. The non-transitory recording medium of claim 1, wherein the computing device includes a display, and
the program further causes the display to display a screen that graphically indicates the behavioral characteristics to allow an operator to choose one of the each person based on the indicated behavioral characteristics.

5. The non-transitory recording medium of claim 1, wherein the multiple kinds of behavior logs for the each person include two or more kinds of logs selected from:
an email transmission history of receiving and sending emails by the each person,
a content of emails of the each person,
telephone call history of incoming and outgoing telephone calls of the each person,
a content of the telephone call history of the each person,
meeting minutes,
a record of positional information of the each person, and
a record of information of a post of the each person.

6. The non-transitory recording medium of claim 1, wherein the multiple kinds of communication information for the each person include two or more kinds of information selected from:
frequency of email transmission by the each person,
the number of recipients designated in an email of the each person,
response time that the each person took to respond to an incoming email,
a predetermined character string extracted from a content of the emails of the each person,
frequency of the incoming and outgoing telephone calls of the each person,
response time that the each person took to respond to an incoming telephone call,
a predetermined character string extracted from a content of the telephone call history of the each person,
frequency of attendance at meetings,
frequency that the each person has spoken during a meeting of the meetings,
a period of time that the each person has spoken during the meeting,
a predetermined character string extracted from a content of what the each person has spoken at the meetings,
information about the meetings with another person, and
information of a structure of an organization that the each person belongs to.

7. The non-transitory recording medium of claim 1, wherein the at least one kind of behavioral characteristic of the each person includes one or more kinds of information selected from:
communication ability of the each person,
a way to give a response frequently used by the each person,
expected response time that the each person is likely to take to give a response,
a degree of politeness in communications of the each person,
a degree of closeness in the communications of the each person, and
a degree of gentleness in the communications of the each person.

8. A method of information processing used in an information processing system including a collection server, a storage device and an analysis server, the collection server and the analysis server each being connected to the storage device, the method comprising:
first obtaining, by the collection server, multiple kinds of behavior logs for each person that include multiple kinds of behavior history records of the each person;
first determining, by the collection server, multiple kinds of communication information for each person that indicate plural aspects of communication behavior of the each person, by processing the multiple kinds of behavior logs;
first recording, by the collection server, either or both of the multiple kinds of behavior logs for the each person and the multiple kinds of communication information for the each person, into the storage device;
second obtaining, from the storage device by the analysis server, either or both of the multiple kinds of behavior logs for the each person and the multiple kinds of communication information for the each person;
second determining, by the analysis server, at least one kind of behavioral characteristic of the each person that indicates how the each person is likely to behave by:
weighting either or both of the multiple kinds of behavior logs for the each person and the multiple kinds of communication information for the each person using predetermined weightings; and
combining either or both of the multiple kinds of behavior logs for the each person and the multiple kinds of communication information for the each person that were weighted; and
second recording, by the analysis server, the at least one kind of behavioral characteristic of the each person into a database in the storage device.

9. The method of claim 8,
wherein the second determining includes determining multiple kinds of behavioral characteristics for the each person.

10. The method of claim 9,
wherein the second determining includes:
weighting the multiple kinds of behavior characteristics using the predetermined weightings; and
combining the multiple kinds of behavior characteristics that were weighted, to determine another kind of behavior characteristic.

11. The method of claim 8,
wherein the analysis server includes a display, and
the method further comprises causing the display to display a screen that graphically indicates the behavioral characteristics to allow an operator to choose one of the each person based on the indicated behavioral characteristics.

12. The method of claim 8,
wherein the information processing system further includes an application server connected to the storage device, the application server includes a display, and
the method further comprises:
- causing, by the application server, the display of the application server to display a screen that allows an operator to input a condition for person retrieval;
- retrieving, by the application server, one or more persons according to the condition inputted on the screen; and
- causing, by the application server, the display of the application server to display a screen indicating the one or more retrieved persons to allow an operator to select one of the one or more retrieved persons on the screen.

13. The method of claim 8,
wherein the multiple kinds of behavior logs for the each person include two or more kinds of logs selected from:
- an email transmission history of receiving and sending emails by the each person,
- a content of emails of the each person,
- telephone call history of incoming and outgoing telephone calls of the each person,
- a content of the telephone call history of the each person,
- meeting minutes,
- a record of positional information of the each person, and
- a record of information of a post of the each person.

14. The method of claim 8,
wherein the multiple kinds of communication information for the each person include two or more kinds of information selected from:
- frequency of email transmission by the each person,
- the number of recipients designated in an email of the each person,
- response time that the each person took to respond to an incoming email,
- a predetermined character string extracted from the content of the emails of the each person,
- frequency of incoming and outgoing telephone calls of the each person,
- response time that the each person took to respond to an incoming telephone call,
- a predetermined character string extracted from a content of the telephone call history of the each person,
- frequency of attendance at meetings,
- frequency that the each person has spoken during a meeting of the meetings,
- a period of time that the each person has spoken during the meeting,
- a predetermined character string extracted from a content of what the each person has spoken at the meeting,
- information about the meetings with another person, and
- information of a structure of an organization that the each person belongs to.

15. The method of claim 8,
wherein the at least one kind of behavioral characteristic of the each person includes one or more kinds of information selected from:
- communication ability of the each person,
- a way to give a response frequently used by the each person,
- expected response time that the each person is likely to take to give a response,
- a degree of politeness in communications of the each person,
- a degree of closeness in the communications of the each person, and
- a degree of gentleness in the communications of the each person.

* * * * *